United States Patent [19]

Carmack et al.

[11] 3,726,600
[45] Apr. 10, 1973

[54] OFF-AXIS ALIGNMENT DEVICE

[75] Inventors: Philip W. Carmack; David J. Sweigart, both of Huntsville, Ala.

[73] Assignee: The United States of America as represented by the Secretary of the Army

[22] Filed: Oct. 6, 1971

[21] Appl. No.: 186,889

[52] U.S. Cl. ................................... 356/253, 356/255
[51] Int. Cl. .............................................. G01b 11/26
[58] Field of Search ..................... 356/153, 172, 138, 356/253, 255

[56] References Cited

UNITED STATES PATENTS 2,402,856   6/1946   Turrettini ......................... 356/153 X

*Primary Examiner*—Ronald L. Wibert
*Assistant Examiner*—F. L. Evans
*Attorney*—Harry M. Saragovitz et al.

[57] ABSTRACT

A device for making a surface parallel with and centered on a fixed reference surface without the necessity of placing an alignment scope on the axis between the two surfaces. A beam splitter is supported by parallel bars from the base of the device. These bars position the beam splitter at a preset angular setting with respect to an alignment mirror of the device. In case the beam splitter is inadvertently moved the support bars will control the repositioning of the beam splitter through a torsion and/or cantilever movement.

5 Claims, 5 Drawing Figures

Philip W. Carmack
David J. Sweigart,
INVENTORS.

Philip W. Carmack
David J. Sweigart,
INVENTORS

Harry M. Saragovitz
Edward J. Kelly
BY Herbert Berl
Charles R. Carter

OFF-AXIS ALIGNMENT DEVICE

BACKGROUND OF THE INVENTION

This invention relates to the field of optical alignment devices. Prior devices are susceptible to misalignment when they are inadvertently jarred or mishandled. Also prior devices require that an alignment telescope be placed on the line of sight axis from a surface being aligned to a fixed reference surface.

SUMMARY OF THE INVENTION

This invention has provided an alignment device less susceptible to misalignment by supporting a beam splitter on a pair of support bars in a cantilever and/or torsion arrangement. Thus when the beam splitter is jarred the bars will return the beam splitter to its original setting because of their cantilever or torsion effect. Also the invention has provided a device for aligning a surface to a fixed reference without the necessity of placing the alignment scope on the alignment axis, such as in making a missile motor parallel with and centered on a fixed reference surface of a test stand and for calibrating hardware such as thrust load cells or optical tooling.

This invention may be better understood from the following detailed description taken in conjunction with the accompanying drawings.

DESCRIPTION OF THE PREFERRED EMBODIMENTS

Figure 1:
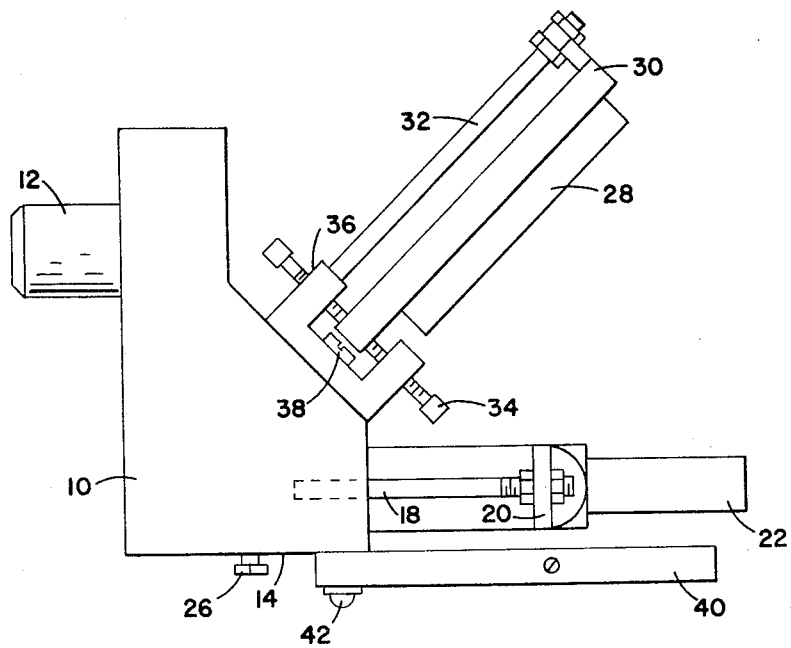
FIG. 1 is a side elevation of one embodiment of the off-axis device.
Figure 2:
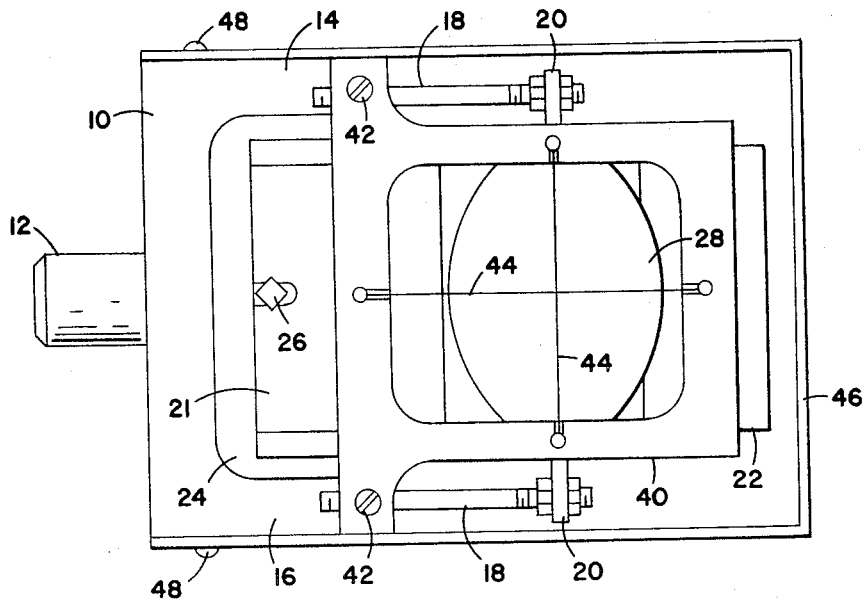
FIG. 2 is a bottom view of the FIG. 1 embodiment with the cover attached.
Figure 3:
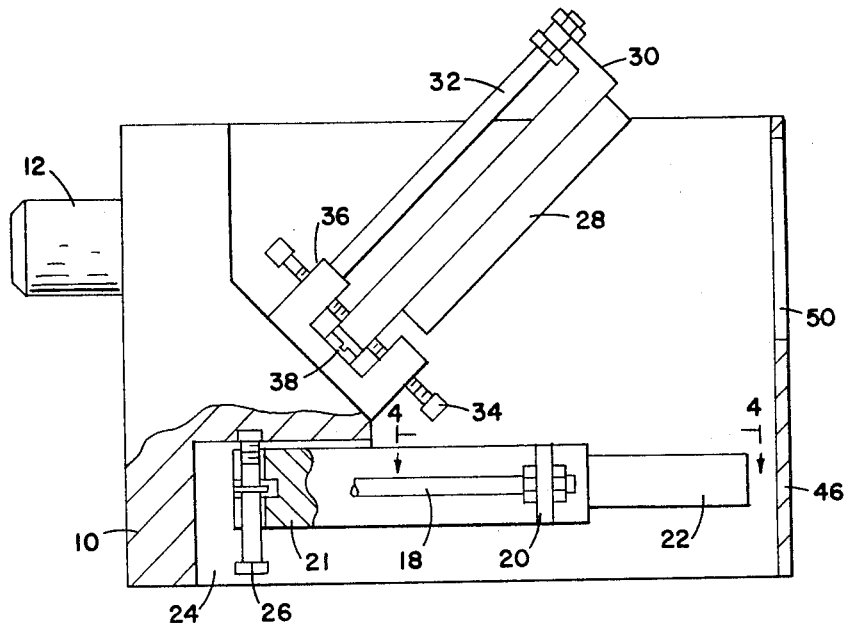
FIG. 3 is an elevation of a second embodiment partially in section with the cover attached.

Referring generally to the two embodiments, reference numeral 10 indicates a support base. A pin 12 projects from one side of the base for centering the base in a hole of a fixed reference surface. Legs 14 and 16 more clearly shown in FIG. 2, extend from the lower side of the base. A pair of support bars 18 each having one end connected to one of said legs and the other ends connected to a pair of supports 20 for supporting a mount 21 which provides a means for mounting for a beam splitter 22. The beam splitter is made of optical glass having properties for reflecting and transmitting an image. The inner ends of supports 20 and the beam splitter are located in an opening 24 between the base legs. In both embodiments the inner end of the mount for the beam splitter is provided with an adjusting means 26 that cooperates with base 10 for adjusting the position of the beam splitter. The support bars control the repositioning of the beam splitter through a torsion and/or cantilever effect in case the beam splitter is inadvertently moved. A front face mirror 28 is connected to a mount 30 having an outer end supported by rods 32 and an inner end supported between adjusting means 34. The rods 32 and adjusting means 34 are connected to a support block 36 which in turn is connected to the base by means 38. The embodiment shown in FIGS. 1 and 2 includes a mounting plate 40 connected to the base legs by means 42 for mounting crosshairs 44 adjacent the beam splitter 22. In the embodiment shown by FIG. 3 the frame is omitted and the crosshairs 44 are etched on the beam splitter for better protection and durability. A U-shaped cover 46 is connected to the base by means 48 and is provided with a dull black finish on the inside thereof to cut down glare and reflections. An opening 50 in the cover provides the mirror with a line of sight along the alignment axis as shown in FIG. 5.

Figure 5:
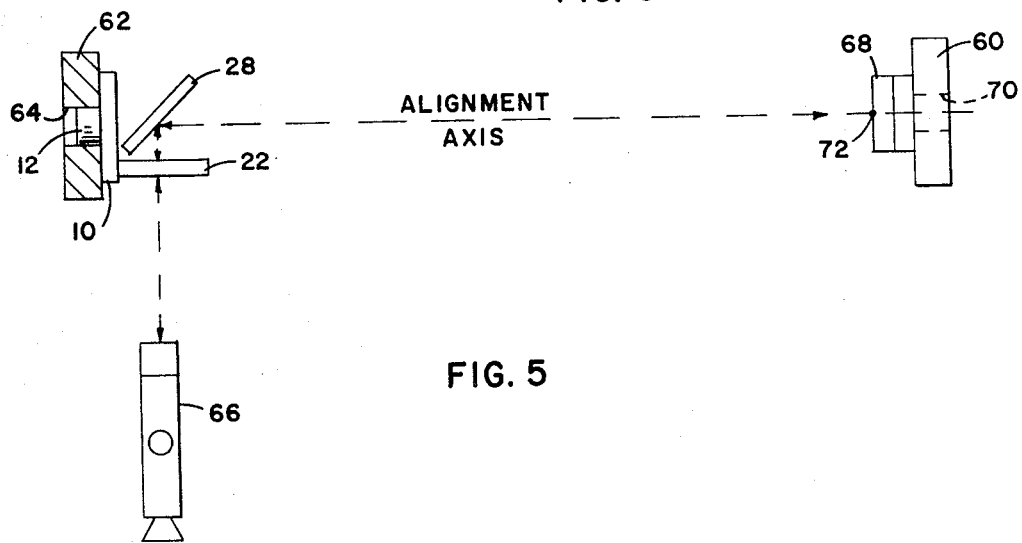
FIG. 5 is a schematic showing the use of either embodiment in an off-axis alignment process.
Figure 4:
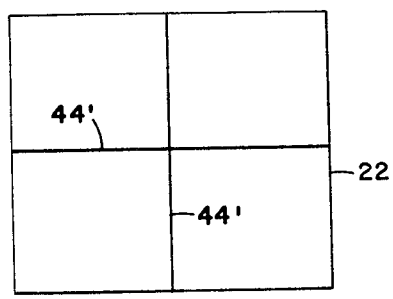
FIG. 4 is a view taken along line 4—4 of FIG. 3, showing the beam splitter only.

The use of either embodiment of the device in the process of off-axis aligning a surface to a fixed reference surface is shown in FIG. 5. A surface 60, such as a missile motor, is to be aligned with a fixed reference surface 62 without placing an alignment scope along the axis between the two surfaces. Before the device is used the beam splitter is adjusted by means 26 so that the beam splitter is at a 45° angle with mirror 28. The device is then mounted with centering pin 12 fitting in a hole 64 of fixed reference surface 62. An alignment scope 66 is positioned off of the alignment axis and adjusted until it is centered on and collimated with the beam splitter and crosshairs. An alignment mirror 68 having a centering pin 70 is mounted on surface 60 which is angularly adjusted until collimation shows mirror 68 is perpendicular to the alignment axis. The surface is then translated until a target 72 placed on the center of mirror 68 indicates that the center of surface 60 is on the alignment axis.

We claim:

1. An off-axis alignment device for use in making a missile motor parallel with and centered on a fixed reference surface of a missile test stand along an axis therebetween comprising: a base having a pin projecting from one side thereof for centering said base on the reference surface; a pair of parallel support bars having one end attached to said base; a beam splitter supported between and by said parallel bars for reflecting and transmitting an image; a rod supported mount connected to said base; a front surface mirror connected to said mount above and at an angle with said beam splitter, and said support bars having their opposite ends connected to said beam splitter and providing a cantilever support of said beam splitter for repositioning the beam splitter with respect to said mirror in the event the beam splitter is inadvertently moved.

2. A device as set forth in claim 1 including means for adjusting said beam splitter relative to said mirror.

3. A device as set forth in claim 2 including a U-shaped cover for enclosing said device and provided with an opening in one side thereof for passage of images to said device.

4. A device as set forth in claim 3 wherein said device is provided with a mounting plate disposed adjacent said beam splitter and crosshairs supported on said mounting plate for alignment purposes.

5. A device as set forth in claim 3 wherein said beam splitter has crosshairs etched thereon.

* * * * *